Patented Apr. 28, 1931

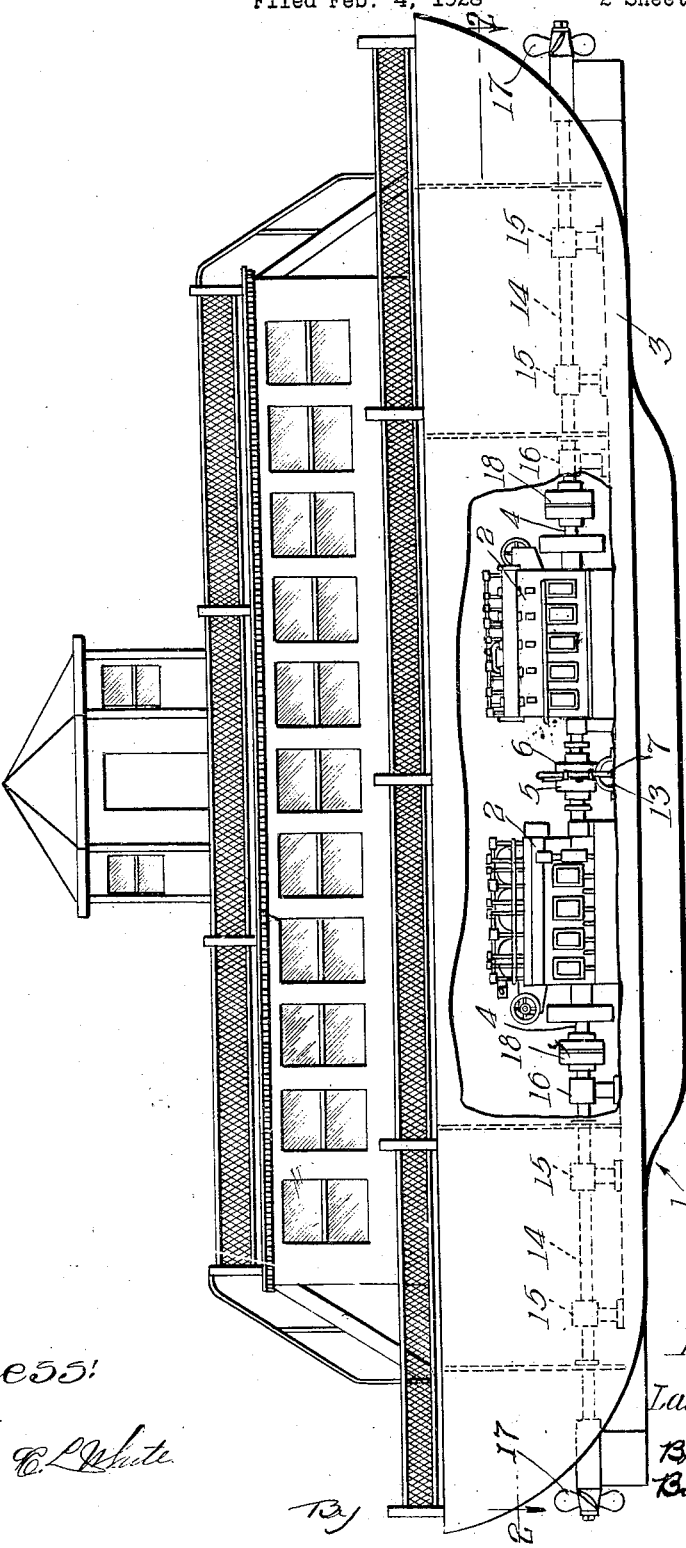

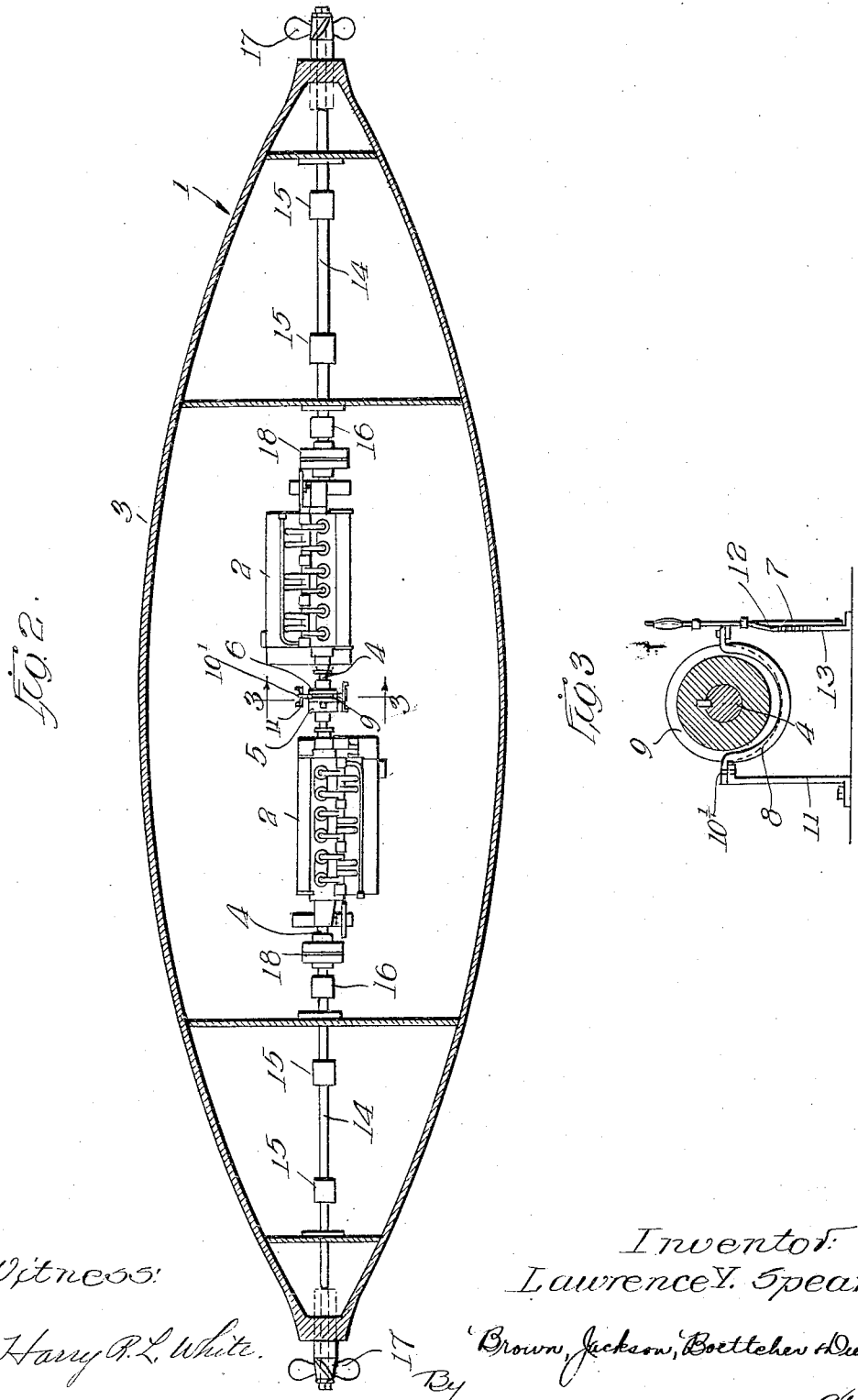

1,802,931

UNITED STATES PATENT OFFICE

LAWRENCE Y. SPEAR, OF NEW LONDON, CONNECTICUT, ASSIGNOR TO ELECTRIC BOAT COMPANY, OF GROTON, CONNECTICUT, A CORPORATION OF NEW JERSEY

FERRYBOAT-PROPELLING MEANS

Application filed February 4, 1928. Serial No. 251,783.

My invention relates to means for propelling ferry boats, which travel short distances forth and back between points on opposite shores of rivers, bays, etc.

My invention involves the use of a propeller at each end of the vessel, and, although that broadly is not new, the particular arrangement of driving means, shafting and clutches, which forms the subject matter of my invention as hereinafter set forth, is novel and characterized by numerous advantages.

In accordance with my invention, I employ two or more engines, and I so arrange them with respect to each other and to the propeller shafts that one or more of the engines, optionally, can be connected to either of the propeller shafts, selectively. By this arrangement, the power from one or more of the engines may be exerted on one propeller, as conditions require, and this power may be exerted on either propeller. Moreover a plurality of engines totaling sufficient power to meet the maximum demand is preferable to a single engine for the purpose, because tandem installation of the smaller engines is better adapted to ferry boat design and because the failure of one engine will not disable the craft.

In the accompanying drawings:

Figure 1 is a side elevational view, partly broken away, of a ferry boat with propelling means according to my invention;

Figure 2 is a plan and horizontal sectional view taken on line 2—2 of Figure 1; and Figure 3 is a sectional view taken on line 3—3 of Figure 2.

I have illustrated my invention as applied to a ferry boat 1. In accordance with my invention, two engines 2, 2, of suitable type such as a Diesel, are disposed within the central portion of the hull 3 of the boat, these engines being arranged with their drive shafts 4 in alignment with each other and with the keel of the boat. The inner ends of the drive shafts 4 of the engines are disposed adjacent each other and have associated therewith a suitable coupling device in order that these shafts may be coupled together so that the engines will operate in unison. I have shown a clutch member 5 of known type secured on the inner end of one of the drive shafts 4 for cooperation with a clutch member 6 feathered on the drive shaft 4 of the other engine and shifted into and out of operative position by means of a shift lever 7 to which is connected a yoke 8 which operates in a groove 9 in member 6, the other end of this yoke being pivoted at 10' to an upright 11. The lever 7 is provided with a spring pressed detent 12 which coacts with a rack 13 in a known manner for locking the lever, and consequently the clutch member 6, in adjustment. The form of coupling or clutch for connecting the drive shafts 4 of the two engines has been illustrated as of a conventional type and any other suitable coupling may be employed for this purpose.

Two propeller shafts 14 are mounted in alignment with the engine drive shafts 4 and extend through and project beyond the ends of the hull 3. These shafts are mounted in suitable bearing members 15 and in thrust bearings 16. The propeller shafts form with the engine drive shafts a through shaft at each end of which is secured a propeller 17 of suitable type, these propellers being mounted at the outer ends of the propeller shafts 14 and being oppositely related. A suitable clutch, such as a magnetic clutch 18 of known type, is interposed between the adjacent ends of each propeller shaft 14 and its associated engine drive shaft 4. These magnetic clutches are operated in well known manner for clutching either of the propeller shafts 14, selectively, to its associated engine drive shaft.

The engines 2 are of the reversible type but under ordinary conditions they operate so as to rotate the propeller shafts 14 in only one direction. In the embodiment shown, this direction is counter-clockwise as considered in Figure 3. When the right hand propeller shaft, as considered in Figure 2, is clutched to its associated engine shaft the boat will be driven toward the left and when the left hand propeller shaft is clutched to its associated engine shaft the boat will be driven toward the right. It will thus be seen that, in order to reverse the direction of travel of the boat, it is only necessary to reverse the relationship of the clutches 18, which may, conveniently, be operated simultaneously by the same mechanism. Normally, both of the engine shafts 4 are clutched together at 5, 6, so that the engines operate in unison. It will thus be seen that, when either of the clutches 18 is thrown in, the associated propeller shaft 14 is operated by the power of both engines. In the event that one of the engines fails, the other engine can still be used for driving either propeller, assuming that the failure of the engine is not such as to prevent rotation of its crank shaft. In the event that the failure of the engine is such as to prevent rotation of its crank shaft, clutch member 6 is shifted into inoperative position so as to disconnect the two engine drive shafts. The other engine may then be used for rotating its associated propeller shaft 14 in either direction for exerting either a pushing or a pulling effect for propelling the boat through the water in either direction.

I claim:

1. In combination in a ferry boat, a pair of axially aligned propeller shafts extending fore and aft of the hull in the plane of the keel and projecting through the bow and the stern of the hull, oppositely related propellers secured on the shafts, a pair of engines having shafts disposed between and coaxial with the propeller shafts, said engines being disposed at opposite sides of the keel line of the hull, the engine shafts and the propeller shafts constituting a through shaft and each of the engines being of sufficient power to drive the through shaft through the other engine and at proper operating speed, means for clutching either of the propeller shafts to and declutching it from the adjacent engine, and means for clutching and declutching the engine shafts.

2. In combination in a ferry boat, a pair of coaxial propeller shafts extending fore and aft of the hull and projecting through the bow and the stern thereof, oppositely related propellers secured on the shafts, a pair of reversible engines disposed between the propeller shafts and having crank shafts coaxial with each other and with said propeller shafts, the engine shafts and the propeller shafts constituting a through shaft and each of the engines being of sufficient power to drive the through shaft through the other engine and at proper operating speed, means for clutching either of the propeller shafts to and declutching it from the adjacent engine shaft, and means for clutching and declutching the engine shafts to and from each other.

In witness whereof I hereunto subscribe my name this 2d day of February, 1928.

LAWRENCE Y. SPEAR.